(12) United States Patent
Chien

(10) Patent No.: US 12,007,565 B2
(45) Date of Patent: Jun. 11, 2024

(54) OPTICAL WAVEGUIDE, MANUFACTURING METHOD OF OPTICAL WAVEGUIDE, AND HEAD-MOUNTED DISPLAY DEVICE

(71) Applicant: Coretronic Corporation, Hsin-Chu (TW)

(72) Inventor: Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/233,521

(22) Filed: Apr. 18, 2021

(65) Prior Publication Data
US 2022/0066214 A1    Mar. 3, 2022

(30) Foreign Application Priority Data

Aug. 28, 2020    (CN) .......................... 202010884312.9

(51) Int. Cl.
*G02B 27/01*    (2006.01)
*G02B 6/12*    (2006.01)
*G02B 6/34*    (2006.01)

(52) U.S. Cl.
CPC ..... *G02B 27/0172* (2013.01); *G02B 6/12004* (2013.01); *G02B 6/34* (2013.01);
(Continued)

(58) Field of Classification Search
CPC .. G02B 27/0172; G02B 6/12004; G02B 6/34; G02B 2006/12035; G02B 2006/12166; G02B 27/10; G02B 6/00
See application file for complete search history.

(56) References Cited

U.S. PATENT DOCUMENTS 5,076,664 A    12/1991    Migozzi
8,665,178 B1 *    3/2014    Wang ................. G02B 27/0172
                                                                345/7
(Continued)

FOREIGN PATENT DOCUMENTS

CN        1784630        6/2006
CN      107991778        5/2018
(Continued)

OTHER PUBLICATIONS

"Search Report of Europe Counterpart Application", dated Oct. 4, 2021, p. 1-p. 9.
(Continued)

*Primary Examiner* — Michael Stahl
(74) *Attorney, Agent, or Firm* — JCIPRNET

(57) ABSTRACT

The disclosure provides an optical waveguide, a manufacturing method of an optical waveguide, and a head-mounted display device. The optical waveguide has a first optical region and a second optical region for transmitting an image beam. The optical waveguide includes a plate body, multiple first light-guiding optical elements, and multiple optical microstructures. The first light-guiding optical elements are disposed in parallel lines on a light-guiding plane inside the plate body. The light-guiding plane is located in the first optical region, and there is a spacing between the adjacent first light-guiding optical elements. The image beam transmitted to the light-guiding plane is separated into multiple sub image beams, and the transmission paths of the sub image beams are at least partially different. The optical coupling-out structure is disposed in the plate body and is located in the second optical region.

18 Claims, 10 Drawing Sheets

(52) U.S. Cl.
CPC .............. *G02B 2006/12035* (2013.01); *G02B 2006/12166* (2013.01)

(56) References Cited

U.S. PATENT DOCUMENTS

| | | | |
|---|---|---|---|
| 8,743,464 B1* | 6/2014 | Amirparviz | G02B 27/0172 |
| | | | 359/633 |
| 9,435,955 B2 | 9/2016 | Dubroca et al. | |
| 9,726,890 B2 | 8/2017 | Akutsu et al. | |
| 10,422,997 B2* | 9/2019 | Hung | G02B 27/0172 |
| 10,670,876 B2* | 6/2020 | Popovich | G02B 6/0038 |
| 10,690,916 B2* | 6/2020 | Popovich | G02B 27/0179 |
| 10,718,946 B2* | 7/2020 | Yang | G02B 27/0172 |
| 2016/0041387 A1* | 2/2016 | Valera | G02B 6/0055 |
| | | | 385/36 |
| 2017/0285346 A1 | 10/2017 | Pan | |
| 2017/0315358 A1 | 11/2017 | Masuda | |
| 2018/0059306 A1* | 3/2018 | Pan | G02B 27/0172 |
| 2018/0203236 A1* | 7/2018 | Shih | G02B 6/0026 |
| 2018/0246302 A1 | 8/2018 | Minefuji | |
| 2018/0284439 A1* | 10/2018 | Vallius | G02B 5/1842 |
| 2018/0299678 A1* | 10/2018 | Singer | G02B 6/005 |
| 2018/0322845 A1* | 11/2018 | Machida | G02F 1/1523 |
| 2019/0094445 A1 | 3/2019 | Meng et al. | |
| 2019/0129085 A1* | 5/2019 | Waldern | G02B 27/0944 |
| 2020/0059589 A1* | 2/2020 | Liu | G06V 40/19 |
| 2020/0089014 A1* | 3/2020 | Peng | G02B 27/142 |
| 2020/0166737 A1 | 5/2020 | Amano | |
| 2020/0183171 A1 | 6/2020 | Robaina et al. | |
| 2020/0192122 A1 | 6/2020 | Dobschal et al. | |
| 2020/0225476 A1* | 7/2020 | Urness | G02B 6/0061 |
| 2022/0099885 A1* | 3/2022 | Ronen | G02B 6/10 |

FOREIGN PATENT DOCUMENTS

| | | |
|---|---|---|
| CN | 208188390 | 12/2018 |
| CN | 107290816 | 4/2020 |
| CN | 111201476 | 5/2020 |
| CN | 211698438 | 10/2020 |
| EP | 3351993 | 7/2018 |
| TW | 200736679 | 10/2007 |
| TW | 202016593 | 5/2020 |
| TW | 202022412 | 6/2020 |
| WO | 2019111927 | 6/2019 |

OTHER PUBLICATIONS

"Office Action of Taiwan Related Application, Application No. 110118173", dated Mar. 9, 2022, p. 1-p. 4.
"Office Action of Taiwan Counterpart Application", dated Dec. 2, 2021, p. 1-p. 8.
"Notice of allowance of U.S. Related Application, U.S. Appl. No. 17/520,596", issued on Feb. 5, 2024, p. 1-p. 26.

* cited by examiner

OPTICAL WAVEGUIDE, MANUFACTURING METHOD OF OPTICAL WAVEGUIDE, AND HEAD-MOUNTED DISPLAY DEVICE

CROSS-REFERENCE TO RELATED APPLICATION

This application claims the priority benefit of China application serial no. 202010884312.9, filed on Aug. 28, 2020. The entirety of the above-mentioned patent application is hereby incorporated by reference herein and made a part of this specification.

BACKGROUND

Technical Field

The disclosure relates to an optical structure, a manufacturing method of an optical structure, and an optical device, particularly to an optical waveguide, a manufacturing method of an optical waveguide, and a head-mounted display device.

Description of Related Art

With the advancement of display technique and people's demand for high technology, the technology of virtual reality and augmented reality have also gradually matured. And the head-mounted display (HMD) is the display adapted to implement above technology. The history of head-mounted displays can be traced back to the U.S. military in the 1970s, when an optical projection system is used to project images or text information on display elements into eyes of its users. In recent years, as the resolution of micro-displays has become higher while the size and the power consumption have become smaller and lower, the head-mounted display has also developed into a portable display device. Besides applying in the field of military, the display technology of the head-mounted display has also grown to occupy a vital position in other fields, such as fields of industrial production, simulation training, stereo display, medical treatment, sports, navigation, electronic games, etc.

Currently, there is a type of head-mounted display device which uses a waveguide element as a light combiner to combine the image beam generated by the optical engine and the ambient beam coming from the environment. This waveguide element is mainly composed of a light-coupling prism, a waveguide plate, and a light-coupling-out microstructure. Specifically, in this waveguide element, the image beam forms a transmission path by passing through the light-coupling prism to the waveguide plate before the image beam is totally reflected and propagated and hits the coupling-out region. And there are light-coupling-out microstructures in the coupling-out region to guide the image beam out of the waveguide plate.

However, since part of the image beam is transmitted through multiple total reflections inside the waveguide plate, for the image beam with specific image information, when the number of total reflections is different, spacings are produced between the image beams with the same specific image information. If the spacing is larger, the spacing between the image beams with the same specific image information when they are guided out of the waveguide plate through the light—coupling-out microstructure is also prone to be larger. Therefore, if the pupils of the human eyes are located at the spacing between the image beams and cannot receive the image beams with the same specific image information, this part of the image would not be seen by the human eyes. Thus, the uniformity of the image seen by the human eye becomes lower and the eyebox also becomes smaller. Moreover, when the field of view of the optical engine is larger or when the waveguide element is thicker, the above phenomenon is even more evident. This not only affects the image quality but is also an adversity to realizing a large viewing angle design in the optical engine of the head-mounted display.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The present disclosure provides an optical waveguide capable of providing a uniform image beam.

The present disclosure provides a head-mounted display device capable of providing images having good quality.

The present disclosure provides a manufacturing method of an optical waveguide, and the manufacturing method is capable of manufacturing an optical waveguide which provides a uniform image beam.

Other objectives and advantages of the disclosure may be further illustrated by the technical features broadly embodied and described as follows.

To achieve one, part, or all of the aforementioned objectives or other objectives, one embodiment of the disclosure provides an optical waveguide. The optical waveguide has a first optical region and a second optical region for transmitting an image beam. The optical waveguide includes a plate body, a plurality of first light-guiding optical elements, and a plurality of optical coupling-out structures. The plate body has a light-entering side, in which the first optical region is located between the light-entering side and the second optical region. A plurality of first light-guiding optical elements are disposed in parallel lines on a light-guiding plane in the plate body, in which the light-guiding plane is located in the first optical region, a spacing exists between the adjacent first light-guiding optical elements, the image beam transmitting to the light-guiding plane is separated into a plurality of sub image beams, transmission paths of the sub image beams are at least partially different, and the sub image beams in the first optical region are transmitted via total reflection to the second optical region. And the optical coupling-out structures are disposed in the plate body and are located in the second optical region.

To achieve one, part, or all of the aforementioned objectives or other objectives, one embodiment of the disclosure provides a head-mounted display device. The head-mounted display device is disposed in front of at least one eye of a user, and includes a display unit and the aforementioned optical waveguide. The display unit is adapted to provide an image beam, and the optical waveguide is adapted to transmit the image beam to at least one eye of the user.

To achieve one, part, or all of the aforementioned objectives or other objectives, one embodiment of the disclosure provides a manufacturing method of an optical waveguide, in which the optical waveguide is adapted to transmit an image beam. The manufacturing method of the optical waveguide includes the following steps. A first structure layer is provided, in which the first structure layer has a first plane. A second structure layer is provided, in which the second structure layer has a second plane. A plurality of first light-guiding optical elements are formed on the first plane or the second plane, in which a spacing exists between the adjacent first light-guiding optical elements. The first structure layer and the second structure layer are connected together so that the first plane and the second plane are in contact with each other to form a light-guiding plane, in which the image beam transmitting to the light-guiding plane is separated into a plurality of sub image beams, transmission paths of the sub image beams are at least partially different, and the sub image beams are transmitted in the first optical region via total reflection.

Based on the above description, the embodiments of the present disclosure have at least one of the following advantages or effects. Through the configuration of the first light-guiding optical elements in the embodiments of the present disclosure, the image beam transmitting to the light-guiding plane may be separated into the sub image beams, increasing effectively the density and uniformity of the image beam. Therefore, the transmission paths of the image beams are increased, which allows the full reflection to be performed in the plate body in a more densely way, such that the image beam may be transmitted densely to the second light-guiding optical elements in the second optical region. Such configuration improves the density and uniformity of the sub image beams when leaving the optical waveguide, increasing the uniformity of the image seen by the human eye, and reducing the occurrence of missing blocks or dark areas in the images. Thus, the image transmitted to the human eyes through the optical waveguide in the head-mounted display device has a high uniformity and good image quality.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
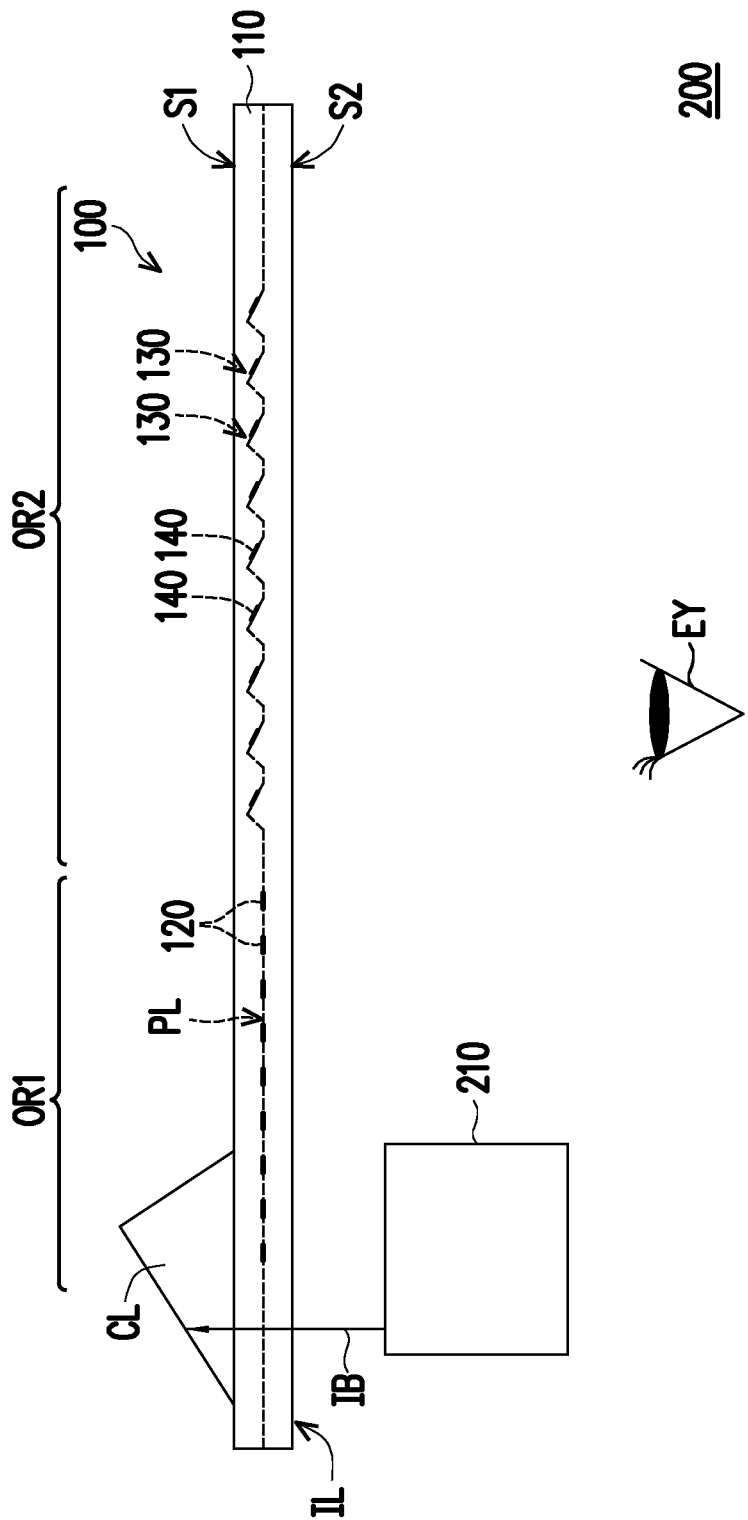
FIG. 1A is a schematic view of the structure of a head-mounted display device according to an embodiment of the disclosure.
Figure 1B:
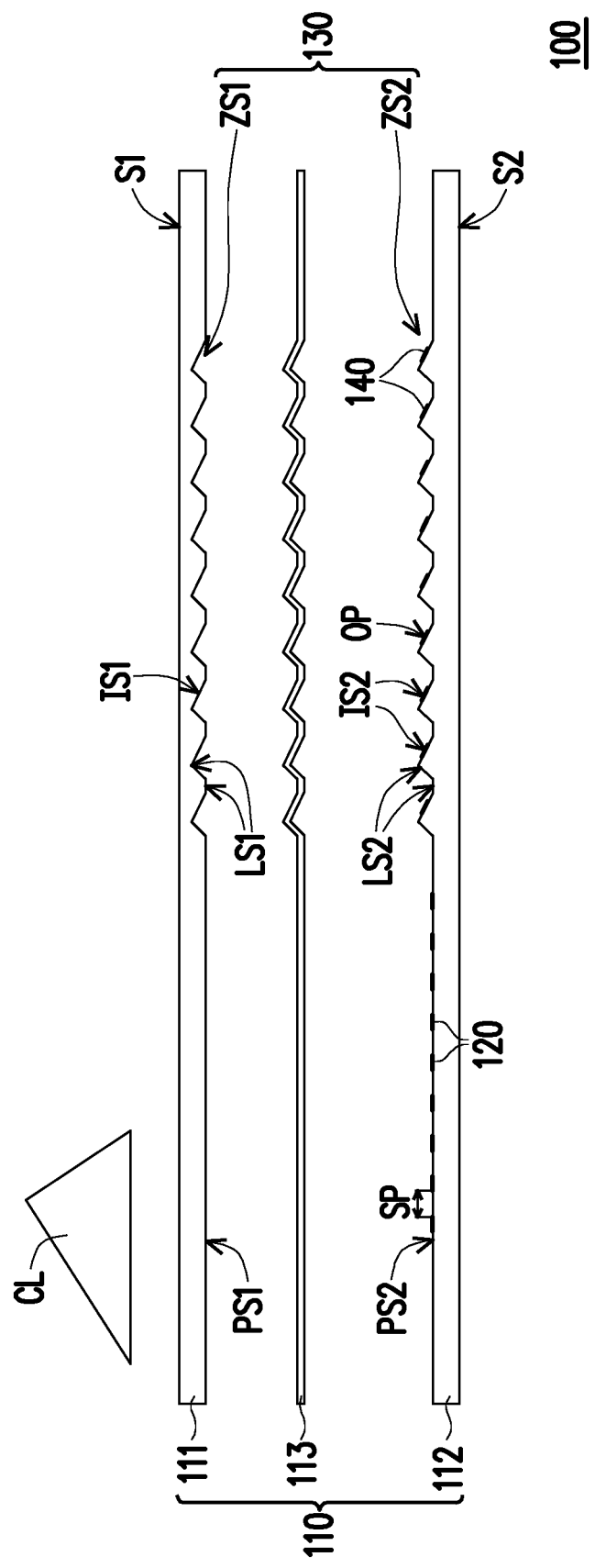
FIG. 1B is an exploded schematic view of the optical waveguide of FIG. 1A.
Figure 1C:
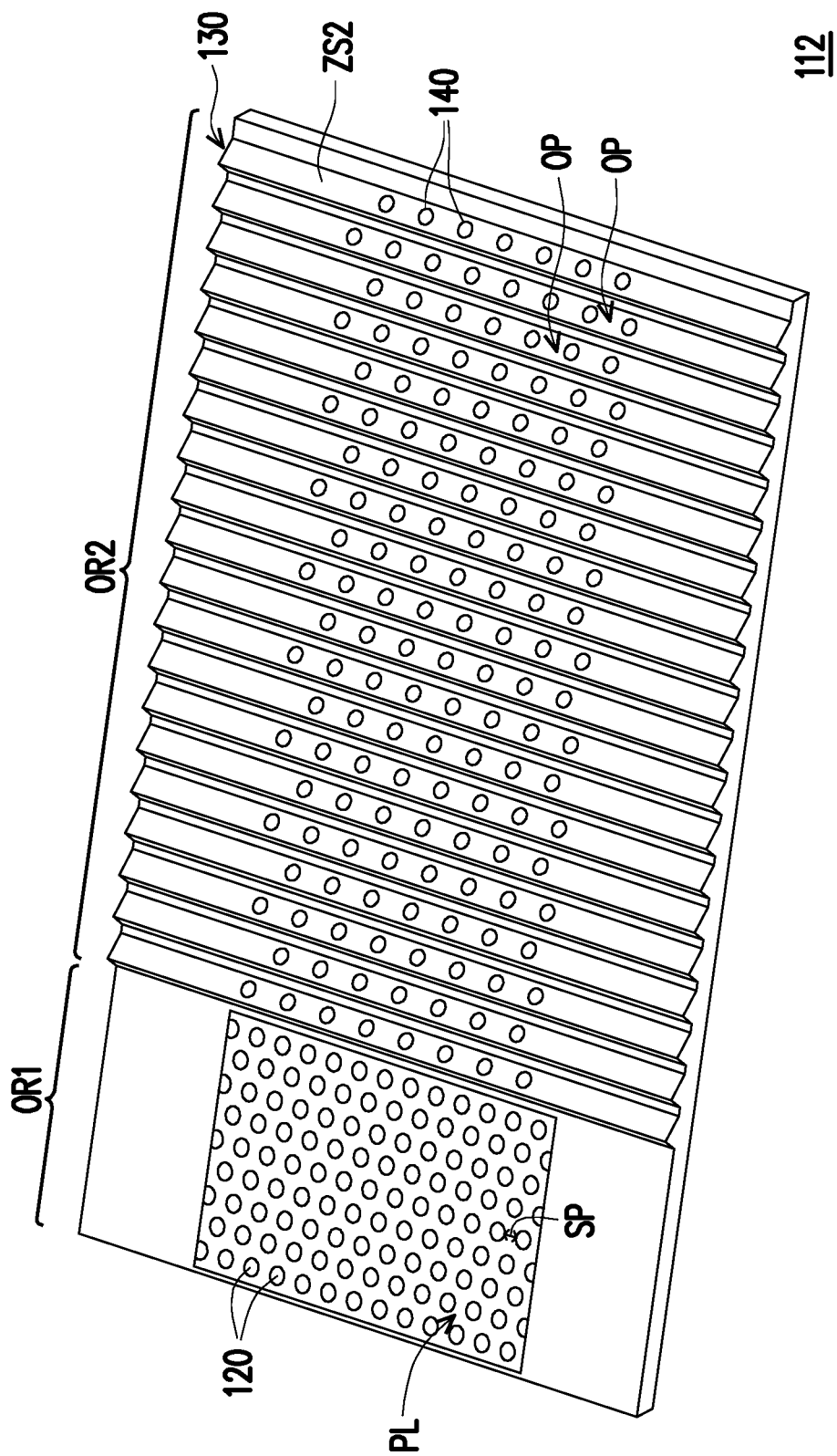
FIG. 1C to FIG. 1E are schematic views of different arrangements of the first light-guiding optical elements of the optical waveguide of FIG. 1A.
Figure 1D:
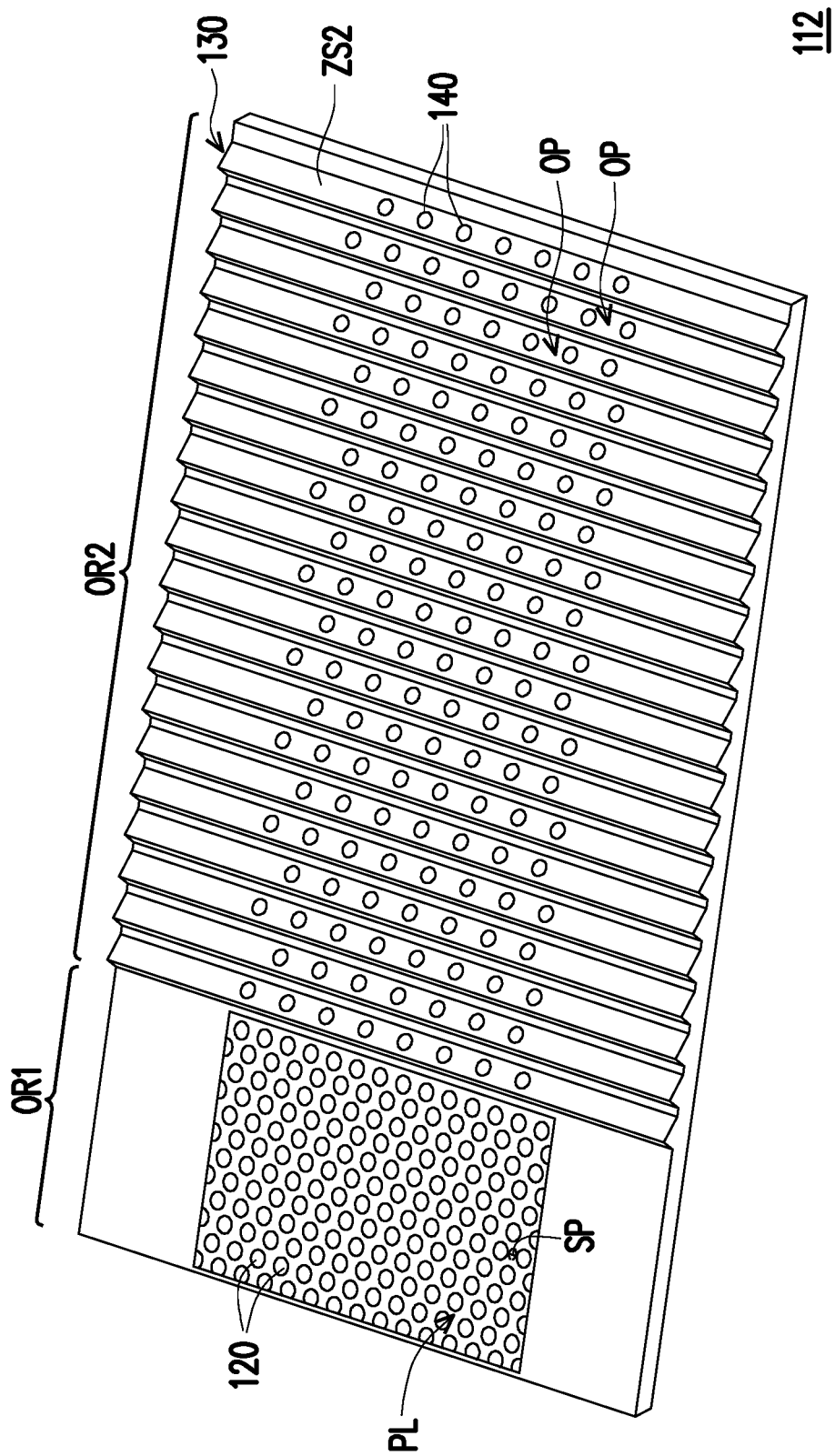
Figure 1E:
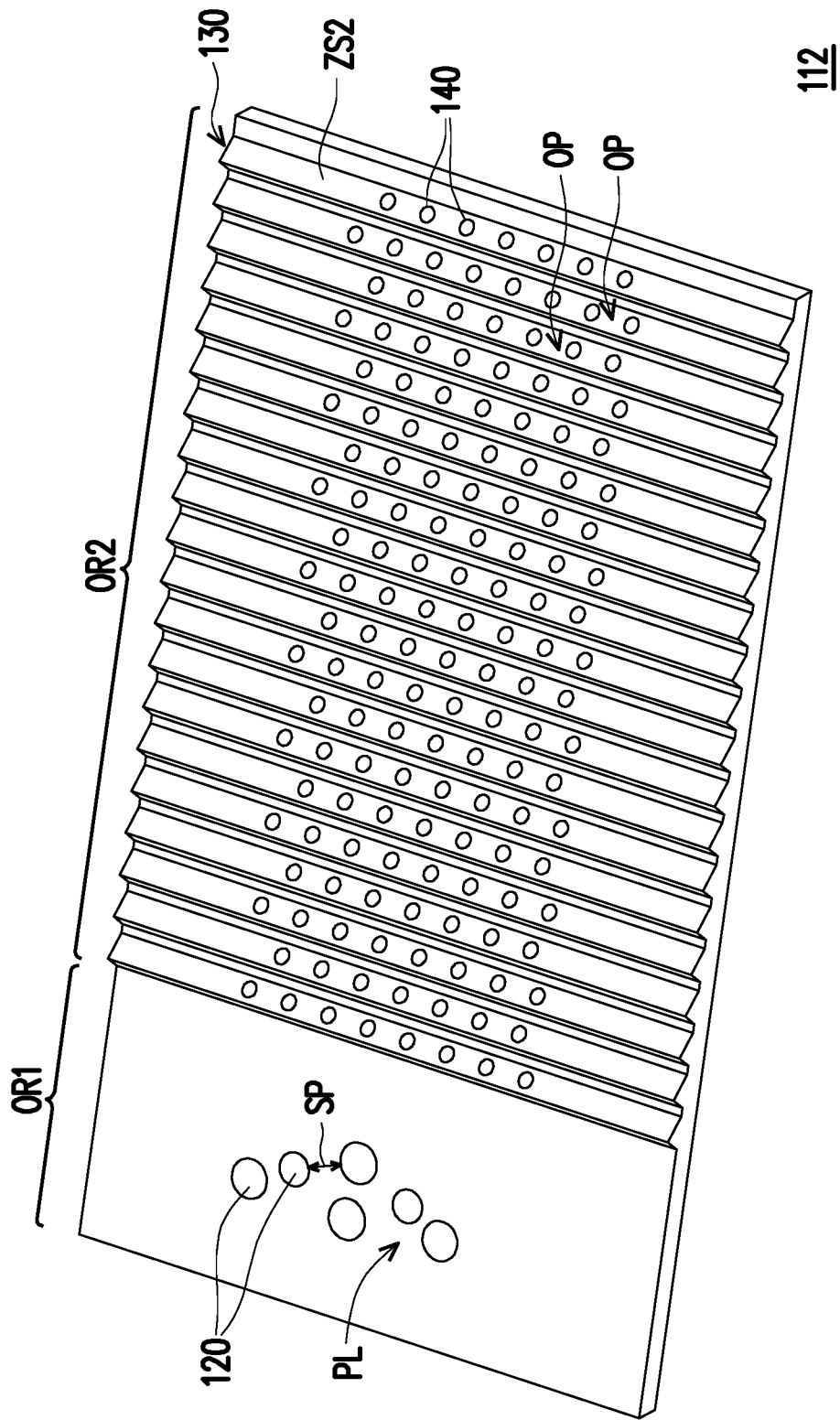

FIG. 1A is a schematic view of the structure of a head-mounted display device according to an embodiment of the disclosure. FIG. 1B is an exploded schematic view of the optical waveguide of FIG. 1A. FIG. 1C to FIG. 1E are schematic views of different arrangements of the first light-guiding optical elements of the optical waveguide of FIG. 1A. In FIG. 1A and FIG. 1B, in this embodiment, a head-mounted display device 200 is configured to be disposed in front of at least one eye EY of a user. The head-mounted display device 200 includes a display unit 210 and an optical waveguide 100. The display unit 210 is adapted to provide an image beam IB, and the optical waveguide 100 is adapted to transmit the image beam IB to the at least one eye EY of the user.

Specifically, as shown in FIG. 1A and FIG. 1B, in this embodiment, the optical waveguide 100 has a first optical region OR1 and a second optical region OR2 for transmitting the image beam IB. The optical waveguide 100 includes a plate body 110, at least one light-coupling prism CL, a plurality of first light-guiding optical elements 120, and a plurality of optical coupling-out structures 130. In addition, in this embodiment, there is only one light-coupling prism CL, but such number is merely an example, and the present disclosure is not limited thereto. In other embodiments, the number of the light-coupling prism may be more than one. In this embodiment, the optical coupling-out structures 130 may be, for example, optical microstructures, but the disclosure is not limited thereto. In other embodiments, the optical coupling-out structures 130 may be, for example, a holographic optical element (HOE), a surface relief grating (SRG), and other diffractive light-coupling-out structures. The following description takes the optical microstructures as the optical coupling-out structures 130.

For example, the optical waveguide 100 may be made by the following steps. First, as shown in FIG. 1B, a first structure layer 111 and a second structure layer 112 are provided. The first structure layer 111 has a first plane PS1 corresponding to a first optical region OR1 of the optical waveguide 100, and a plurality of first inclined surfaces IS1 and a plurality of first connecting surfaces LS1 which correspond to a second optical region OR2 of the optical waveguide 100. Each of the first connecting surfaces LS1 of the first structure layer 111 is connected to different ends of the adjacent first inclined surfaces IS1 to form a first zigzag structure ZS1. The light-coupling prism CL and the first zigzag structures ZS1 are located respectively on different and opposite surfaces of the first structure layer 111. The second structure layer 112 also has a second plane PS2 corresponding to the first optical region OR1, and a plurality of second inclined surfaces IS2 and a plurality of second connecting surfaces LS2 which correspond to the second optical region OR2. And each of the second connecting surfaces LS2 is connected to different ends of the adjacent second inclined surfaces IS2 to form a second zigzag structure ZS2.

Next, a plurality of first light-guiding optical elements 120 are formed on the first plane PS1 of the first structure layer 111 or the second plane PS2 of the second structure layer 112. Specifically, as shown in FIG. 1C to FIG. 1E, in this embodiment, the first light-guiding optical elements 120 are formed on the second plane PS2 of the second structure layer 112, but the present disclosure is not limited thereto. In another embodiment which is not illustrated herein, the first light-guiding optical elements 120 may also be formed on the first plane PS1 of the first structure layer 111. Also, in this embodiment, a spacing SP is formed between the adjacent first light-guiding optical elements 120, and the spacing SP between the adjacent first light-guiding optical elements 120 may be adjusted based on the required uniformity of the image beam IB, that is, the spacings SP between the adjacent first light-guiding optical elements 120 may be the same or different from one another. Furthermore, as shown in FIG. 1C to FIG. 1E, the first light-guiding optical elements 120 may be arranged regularly (as shown in FIG. 1C to FIG. 1D) or be arranged randomly (as shown in FIG. 1E). Also, in this embodiment, the first light-guiding optical elements 120 may be, for example, a mirror reflection layer, and the size of each of the first light-guiding optical elements 120 is smaller than 2 mm.

Meanwhile, a plurality of second light-guiding optical elements 140 are respectively formed on the first inclined surfaces IS1 of the first structure layer 111 or respectively formed on the second inclined surfaces IS2 of the second structure layer 112. Specifically, as shown in FIG. 1C to FIG. 1E, in this embodiment, the second light-guiding optical elements 140 are respectively formed on the second inclined surfaces IS2 of the second structure layer 112, that is, each of the second light-guiding optical elements 140 is formed on the corresponding second inclined surface IS2, but the present disclosure is not limited thereto. In another embodiment not illustrated herein, the second light-guiding optical elements 140 may also be respectively formed on the first inclined surfaces IS1 of the first structure layer 111. Furthermore, in this embodiment, the second light-guiding optical elements 140 are a partially reflective layer. When the image beam is incident on the second light-guiding optical elements 140, each of the second light-guiding optical elements 140 may allow part of the image beam IB to pass therethrough and reflect another part of the image beam IB. In this embodiment, the materials of the first light-guiding optical element 120 and the second light-guiding optical element 140 are not the same, and thus the manufacturing process of the first light-guiding optical element 120 may be different from that of the second light-guiding optical element 140, but the present disclosure is not limited thereto. In other embodiments, when the material of the first light-guiding optical element 120 is the same with the material of the second light-guiding optical element 140, the manufacturing process of the first light-guiding optical element 120 and that of the second light-guiding optical element 140 may also be performed in the same manufacturing process. For example, in this embodiment, the steps of processing the first light-guiding optical element 120 and of processing the second light-guiding optical element 140 are implemented by using a photomask process, photoresist development, laser, etc. so as to form a pattern of the first light-guiding optical element 120 and a pattern of the second light-guiding optical element 140.

Next, a bonding layer 113 is provided for connecting the first structure layer 111 with the second structure layer 112, making the first plane PS1 of the first structure layer 111 correspond to the second plane PS2 of the second structure layer 112, the second inclined surfaces IS2 of the second structure layer 112 correspond to the first inclined surfaces IS1 of the first structure layer 111, and the second connecting surfaces LS2 correspond to the first connecting surfaces LS1, such that the first plane PS1 and the second plane PS2 are in contact with each other to form a light-guiding plane PL, and that the first zigzag structures ZS1 may match with the second zigzag structures ZS2 to form a plurality of optical microstructures 130, in which a plurality of optical surfaces OP of the optical microstructures 130 are formed by contacting the second inclined surface IS2 with the first inclined surface IS1. With such configuration, after connecting the first structure layer 111 with the second structure layer 112, the plate body 110 of the optical waveguide 100, the first light-guiding optical elements 120, and the optical microstructures 130 are formed. The bonding layer 113 is, for example, a colloid or glue. The difference between the refractive index of the bonding layer 113 and that of the first structure layer 111 is less than 0.01, and the difference between the refractive index of the bonding layer 113 and that of the second structure layer 112 is also less than 0.01.

Furthermore, as shown in FIG. 1A to FIG. 1B, the plate body 110 which forms the optical waveguide 100 has a light-entering side IL, and a first surface S1 and a second surface S2 facing each other, in which the first optical region OR1 is located between the light-entering side IL and the second optical region OR2. The light-guiding plane PL, which is formed by the first plane PS1 of the first structure layer 111 and the second plane PS2 of the second structure layer 112, is located in the first optical region OR1 of the optical waveguide 100. And the light-guiding plane PL is located between and parallel to the first surface S1 and the second surface S2 of the plate body 110, and the first light-guiding optical elements 120 are disposed in parallel lines on the light-guiding plane PL in the plate body 110. At the same time, the optical microstructure 130, which is formed by the first zigzag structure ZS1 and the second zigzag structure ZS2, is located in the second optical region OR2 of the optical waveguide 100. Optical surfaces OP of the optical microstructures 130 are formed by the first inclined surfaces IS1 of the first structure layer 111 and the second inclined surfaces IS2 of the second structure layer 112. And the optical surface OP of each optical microstructure 130 is respectively inclined with respect to the light-guiding plane PL.

Figure 1F:
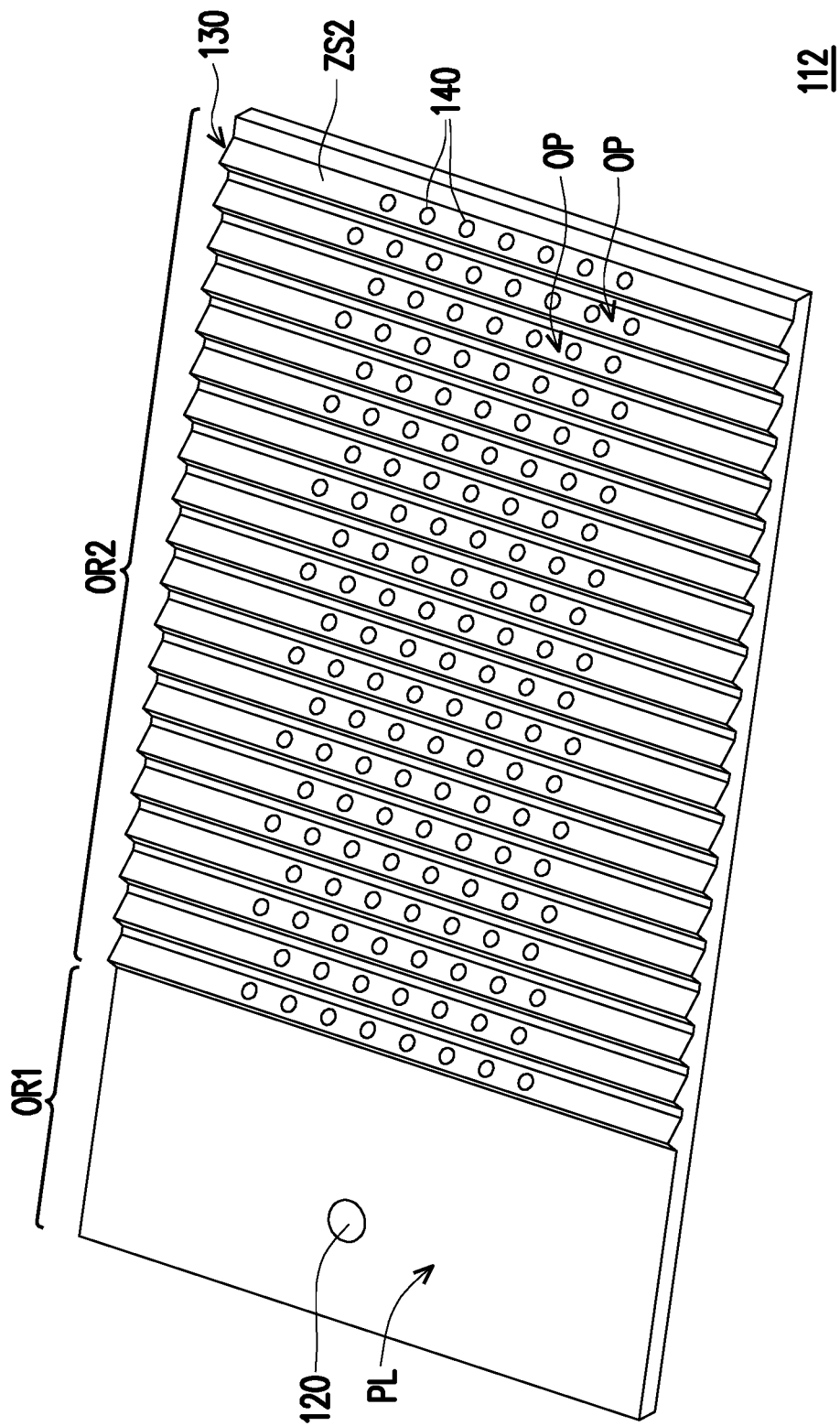
FIG. 1F is a schematic view of another first light-guiding optical element of the optical waveguide of the present disclosure.

FIG. 1F is a schematic view of another first light-guiding optical element of the optical waveguide of the present disclosure. Only one first light-guiding optical element 120 is disposed in the first optical region OR1 of the optical waveguide 100 in this embodiment, and its size is smaller than 2 mm. By disposing the at least one first light-guiding optical element 120, the occurrence of images with missing blocks or dark areas are reduced.

The optical path of the image beam IB transmitting through the optical waveguide 100 is further explained below in cooperation with FIG. 2A and FIG. 2B.

Figure 2A:
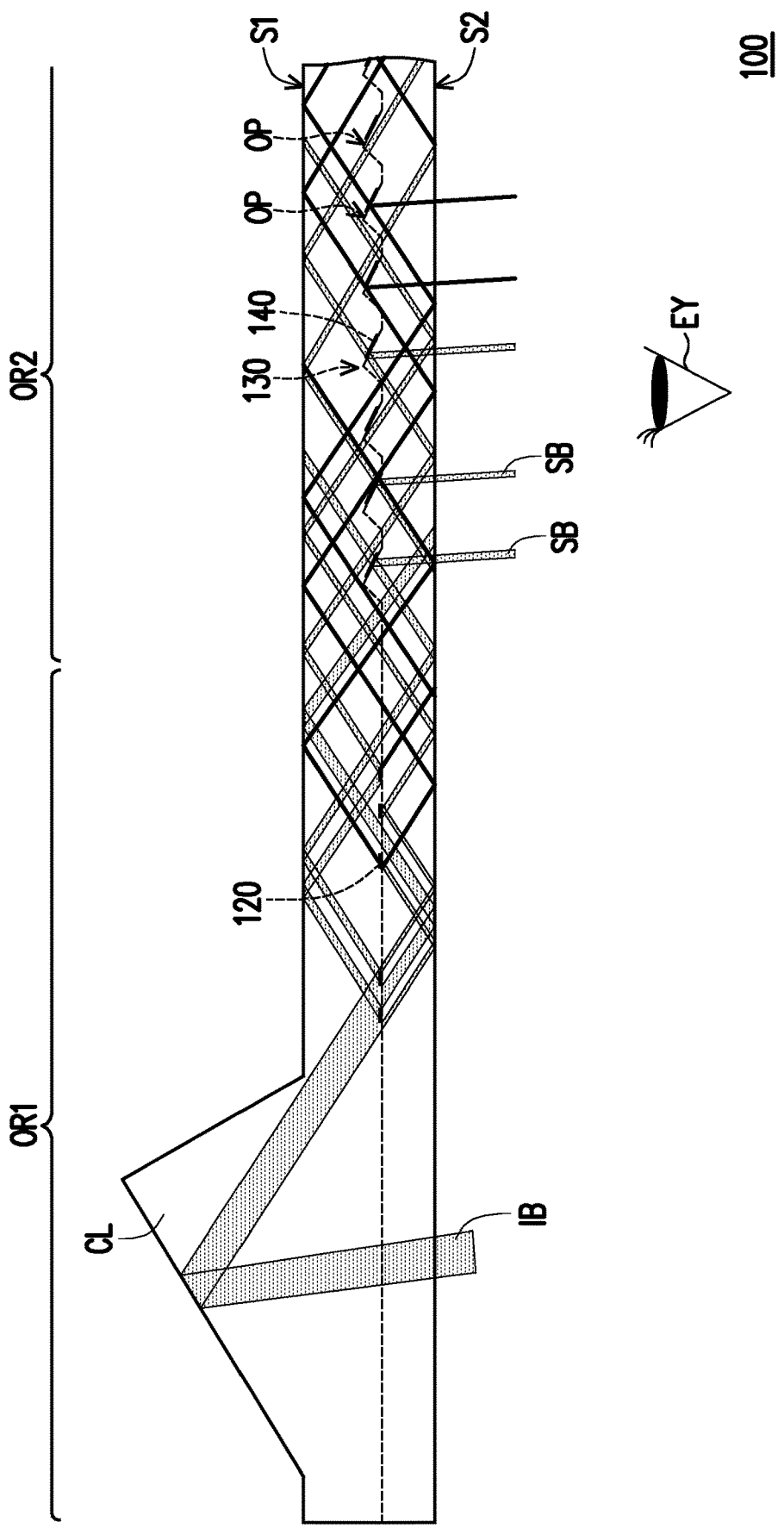
FIG. 2A is a schematic view of an optical path of an image beam transmitting through the optical waveguide of FIG. 1A.

FIG. 2A is a schematic view of an optical path of an image beam transmitting through the optical waveguide of FIG. 1A. FIG. 2B is a schematic view of an optical path of the first optical region of the optical waveguide of FIG. 2A. Specifically, as shown in FIG. 2A and FIG. 2B, when the image beam IB enters the plate body 110 through the first surface S1 of the plate body 110, the image beam IB is reflected by the inclined surface of the light-coupling prism CL to guide into the optical waveguide 100 and then is transmitted in the optical region OR1 of the plate body 110. And, via total reflection in the plate body 110, the image beam IB may be transmitted to the second optical region OR2 of the plate body 110 which is provided with the second light-guiding optical elements 140, and then be coupled out of the optical waveguide 100 through the second light-guiding optical elements 140. That is, in this embodiment, the light-entering side IL is disposed to correspond to the light-coupling prism CL to form a coupling region. The first optical region OR1 is the total reflection transmission region of the image beam IB. And, the second optical region OR2 is the coupling-out region, adapted to guide the image beam IB transmitted from the first optical region OR1 to leave the optical waveguide 100 and travel to at least one eye EY of the user.

Figure 2B:
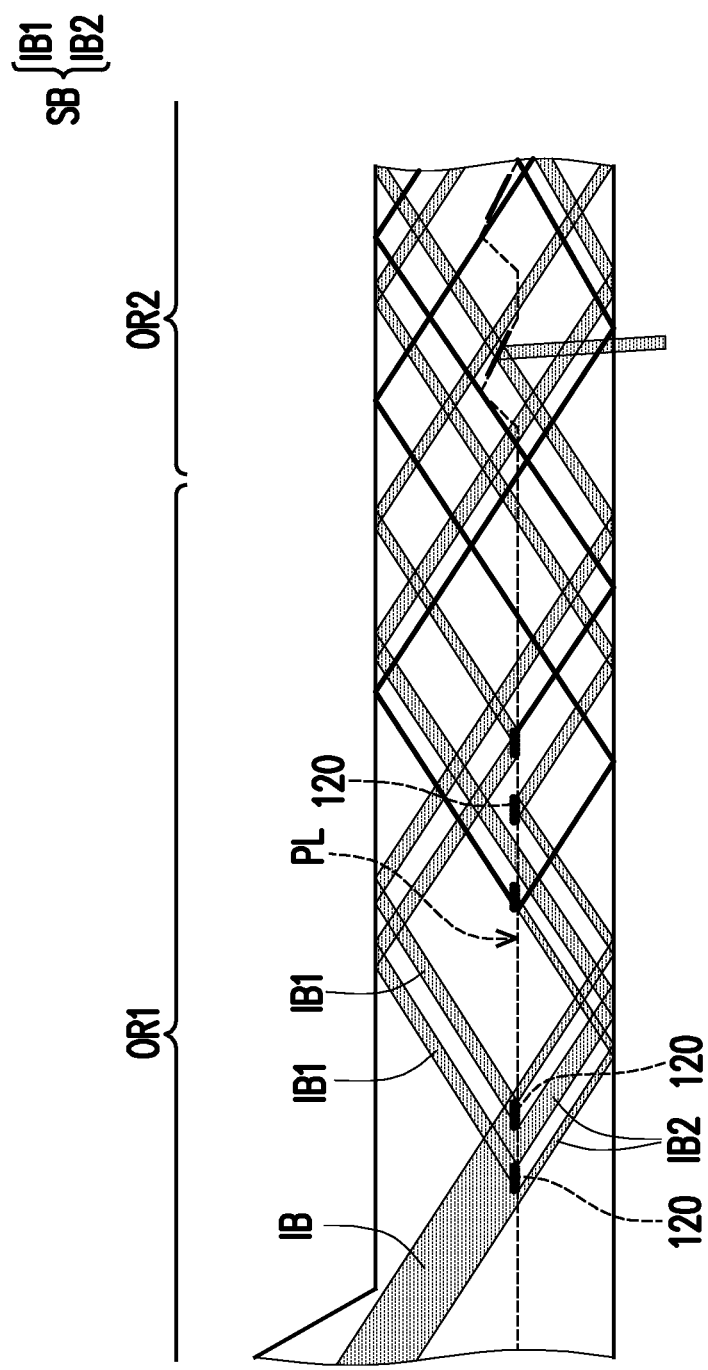
FIG. 2B is a schematic view of an optical path of the first optical region of the optical waveguide of FIG. 2A.

Moreover, as shown in FIG. 2B, the image beam IB transmitting to each of the first light-guiding optical elements 120 is reflected by the first light-guiding optical elements 120 to form a first partial image beam IB1, whereas the image beam IB transmitting through the spacings SP between any two adjacent first light-guiding optical elements 120 forms a second partial image beam IB2. In this way, the transmission path of the image beam IB transmitting to the light-guiding plane PL may be changed based on whether the first light-guiding optical elements 120 reflect the image IB beam or not, so as to separate the beam into a plurality of sub image beams SB. As shown in FIG. 2B, the image beam IB transmitting to one of the first light-guiding optical elements 120 is formed into the first partial image beam IB, whereas the image beam IB transmitting through one of the spacings SP is formed into the second partial image beam IB2. And, the first partial image beam IB1 and the second partial image beam IB2 which are continuously formed when travelling through the first optical region OR1 by the first light-guiding optical elements 120 form the sub image beams SB. And the transmission paths of these sub image beams SB are at least partly different from one another, and are transferred to the second optical region OR2 via total reflection in the first optical region OR1, such that, when travelling through the light-guiding plane PL, the image beam IB may be divided into the sub image beams SB, thereby increasing effectively the density of the image beam IB.

Next, as shown in FIG. 2A, when the sub image beams SB are transmitted to the optical surfaces OP of the optical microstructures 130 in the second optical region OR2, since the second light-guiding optical elements 140 are located on the optical surfaces OP of the optical microstructures 130, the sub image beams SB may be coupled out of the optical waveguide 100 by the second light-guiding optical elements 140 in the second optical region OR2. In this embodiment, each of the second light-guiding optical element 140 may be an element which allows part of light to pass therethrough and reflect another part of the light. Thus the second light-guiding optical elements 140 may be adapted to make part of each sub image beam SB pass therethrough and reflect the another part of the sub-image beam SB. Therefore, part of each sub image beam SB continues to be transmitted in the second optical region OR2 of the plate body 110 after passing through the second light-guiding optical elements 140 while another part of the sub image beams SB leave the plate body 110 from the second surface S2 after being reflected by the second light-guiding optical elements 140. In this way, the optical waveguide 100 may be adapted to transmit the image beam IB to at least one eye EY of the user, and display an image in the eye of the user. In other embodiments, the second light-guiding optical element 140 is a mirror reflection element, and at least part of the sub image beams being incident onto the second light-guiding optical element 140 will be reflected, whereas other sub image beams which are not incident onto the second light-guiding optical elements 140 continue to be transmitted in the second optical region until they are reflected by the second light-guiding optical elements 140. Therefore, the sub image beams leave the plate body from the second surface after being reflected by the second light-guiding optical elements.

More specifically, the distance between the second light-guiding optical elements 140 must be defined according to the size of the pupil of the human eye. When the distance between the second light-guiding optical elements 140 is smaller, after travelling to the second light-guiding optical element 140, the image beam IB can be coupled out of the optical waveguide 100 in a more densely way to be transmitted to the human eye. For example, the second light-guiding optical elements 140 are, for example, optical film patterns, and the distance between two adjacent second light-guiding optical elements 140 is less than or equal to 4 mm, and the minimum distance refers to the distance from the center of one second light-guiding optical element 140 to the center of another adjacent second light-guiding optical element 140. And, as shown in FIG. 2A, in this embodiment, there may also be a flat penetration region between the adjacent second light-guiding optical elements 140, so that an ambient light (not illustrated) passes through the flat penetration region of the optical waveguide 100 to be transmitted to at least one eye EY of the user, such that the head-mounted display device 200 achieves the function of augmented reality. The ambient light (not illustrated) enters the optical waveguide 100 from the first surface S1, penetrates the flat penetration region between the adjacent second light-guiding optical elements 140, and leaves the optical waveguide 100 from the second surface S2. In addition, in this embodiment, the distance between the second light-guiding optical elements 140 may also be controlled to be equal to or unequal to one another to adjust the uniformity of brightness of the viewed image. Furthermore, the sizes of the second light-guiding optical elements 140 may be different such that it is possible to adjust the uniformity of brightness of the image viewed by the eyes.

In this way, through the configuration of the first light-guiding optical elements 120 in the first optical region OR1 in this embodiment, the image beam IB transmitting to the light-guiding plane PL is separated into the sub image beams SB, increasing effectively the density and uniformity of the image beam IB. Therefore, the image beam IB may be transmitted to the second light-guiding optical elements 140 in the second optical region OR2 in a more densely way, improving the density and uniformity of the sub image beams SB when leaving the optical waveguide 100, increasing the uniformity of the image seen by the human eye, and reducing the occurrence of missing blocks or dark areas in the images. Thus, the image transmitted to the human eyes through the optical waveguide 100 in the head-mounted display device 200 has a high uniformity and good image quality.

Figure 3A:
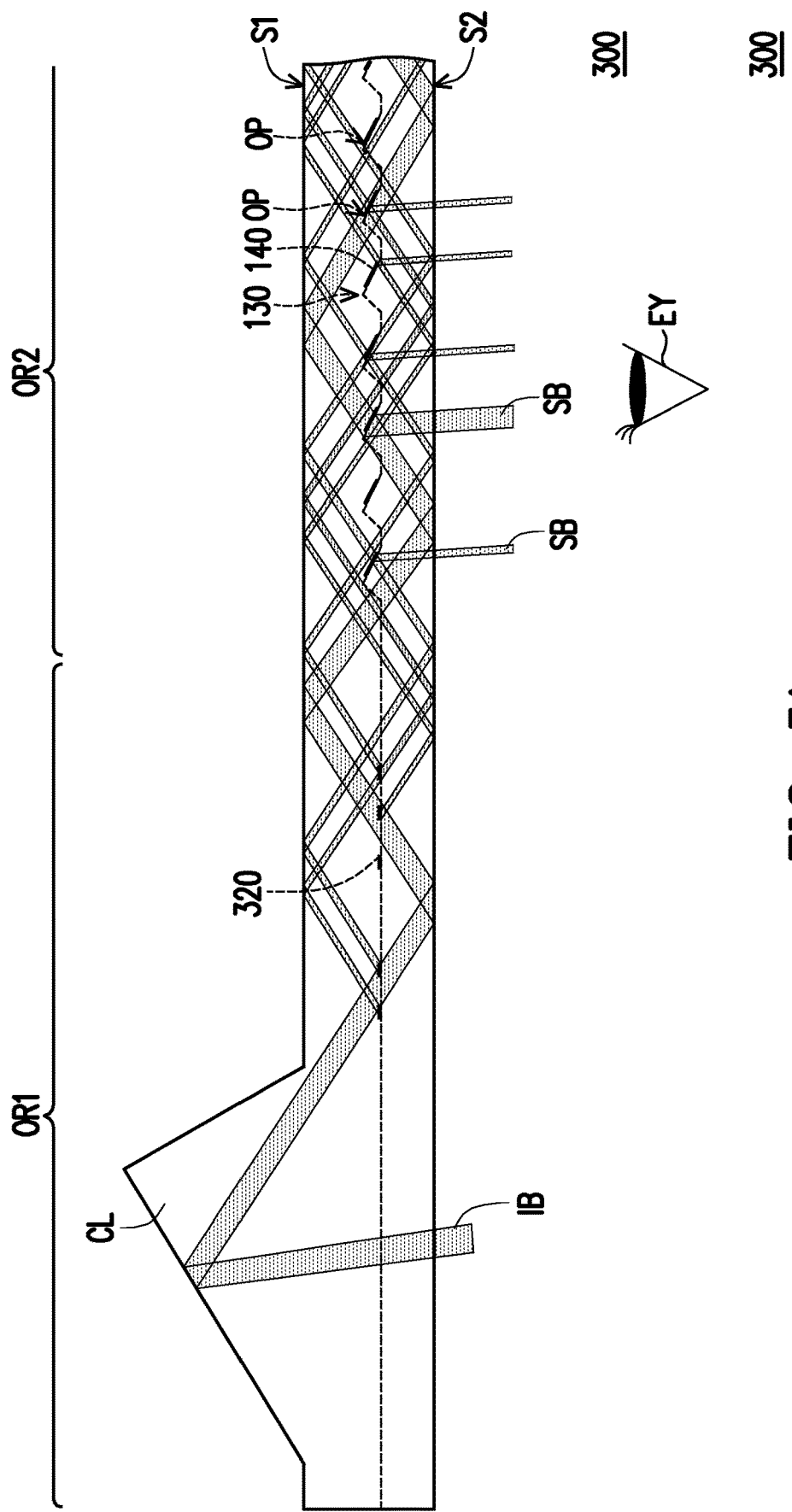
FIG. 3A is a schematic view of another optical path of an image beam transmitting through the optical waveguide of FIG. 1A.
Figure 3B:
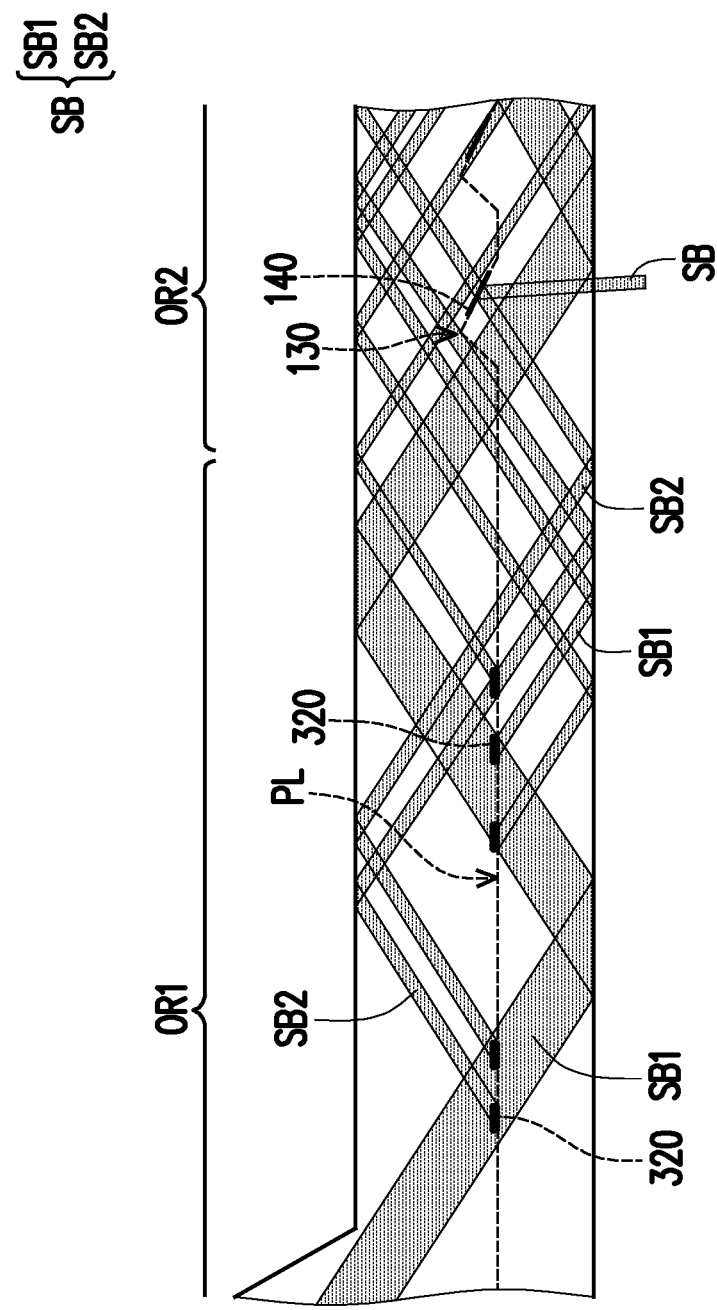
FIG. 3B is a schematic view of an optical path of an image beam transmitting to the first optical region of the optical waveguide of FIG. 3A.

FIG. 3A is a schematic view of another optical path of an image beam transmitting through the optical waveguide of FIG. 1A. And FIG. 3B is a schematic view of the optical path of an image beam transmitted to the first optical region of the optical waveguide of FIG. 3A. In FIG. 3A and FIG. 3B, an optical waveguide 300 of FIG. 3A and FIG. 3B is similar to the optical waveguide 100 of FIG. 2A and FIG. 2B, and their differences are described as follows. As shown in FIG. 3A and FIG. 3B, in this embodiment, a first light-guiding optical element 320 of the optical waveguide 300 is a partially reflective layer. Therefore, as shown in FIG. 3B, when an image beam IB travels through each of the first light-guiding optical elements 320, part of the image beam IB passes through each of the first light-guiding optical elements 320 and the spacings SP between the two adjacent first light-guiding optical elements 320 to form a first sub image beam SB1, and another part of the image beam IB is reflected by each of the first light-guiding optical elements 320 to form a second sub image beam SB2. In other words, when the image beam IB transmits to the first light-guiding optical elements 320, the transmission paths of part of the image beam IB are changed to form the second sub image beam SB2. And, as shown in FIG. 3B, the first sub image beam SB1 and the second sub image beam SB2 continue to be transmitted in the first optical region OR1, so that they may be formed into different first sub image beams SB1 and second sub image beams SB2, and may also be used to form the sub image beams SB.

In this way, through the configuration of the first light-guiding optical elements 320, the image beam IB transmitting to the light-guiding plane PL of the optical waveguide 300 may be divided into the sub image beams SB, thereby increasing effectively the density and uniformity of the image beam IB, such that the optical waveguide 300 also achieves the effects and advantages similar to the aforementioned optical waveguide 100, which will not be repeated here. Moreover, when the optical waveguide 300 is applied to the head-mounted display device 200, the head-mounted display device 200 also achieves similar effects and advantages, which will also not be repeated here.

In summary, the embodiments of the disclosure have at least one of the following advantages or effects. Through the configuration of the first light-guiding optical element in the embodiments of the present disclosure, the image beam transmitting to the light-guiding plane is separated into the sub image beams, increasing effectively the density and uniformity of the image beam. Therefore, the image beam may be transmitted via a full reflection in the plate body in a more densely way, generating various transmission paths, such that the image beam may be transmitted to the second light-guiding optical elements of the second optical region. Such configuration improves the density and uniformity of the sub image beams when leaving the optical waveguide, increasing the uniformity of the image seen by the human eye, and reducing the occurrence of missing blocks or dark areas in the images. Thus, the image transmitted to the human eyes through the optical waveguide in the head-mounted display device has a high uniformity and good image quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An optical waveguide, comprising: a first optical region and a second optical region for transmitting an image beam, a plate body, a plurality of first light-guiding optical elements, and a plurality of optical coupling-out structures, wherein:

the plate body comprises a light-entering side, wherein the first optical region is located between the light-entering side and the second optical region;

the first light-guiding optical elements are disposed in parallel lines on a light-guiding plane in the plate body, wherein the light-guiding plane is located in the first optical region, a spacing exists between the adjacent first light-guiding optical elements, the image beam transmitting to the light-guiding plane is separated into a plurality of sub image beams, transmission paths of the sub image beams are at least partially different, and the sub image beams in the first optical region are transmitted via total reflection to the second optical region; and the optical coupling-out structures are disposed in the plate body and are located in the second optical region, wherein the plate body comprises a first surface and a second surface opposite to each other, and the light-guiding plane is located between and parallel to the first surface and the second surface, wherein the optical coupling-out structures are a plurality of optical microstructures, each of the optical microstructures respectively comprises an optical surface, the optical surfaces of the optical microstructures are respectively inclined with respect to the light-guiding plane, and the optical waveguide further comprises:

a plurality of second light-guiding optical elements, located on the optical surfaces of the optical microstructures, wherein the second light-guiding optical elements are adapted to reflect at least part of at least one of the sub image beams, wherein another part of the at least one of the sub image beams continues to be transmitted in the plate body, and the at least part of the at least one of the sub image beams leaves the plate body from the second surface after being reflected by the second light-guiding optical elements.

2. The optical waveguide according to claim 1, wherein the first light-guiding optical elements are a partially reflective layer, when the image beam transmits to each of the first light-guiding optical elements, part of the image beam penetrates each of the first light-guiding optical elements to form a first sub image beam, and another part of the image beam is reflected by each of the first light-guiding optical elements to form a second sub image beam, and the first sub image beam and the second sub image beam are adapted to form the sub image beams.

3. The optical waveguide according to claim 1, wherein the first light-guiding optical elements are a mirror reflection layer, when the image beam transmits to each of the first light-guiding optical elements, the image beam reflected by the first light-guiding optical elements forms a first partial image beam, the image beam passing through the spacing between the two adjacent first light-guiding optical elements forms a second partial image beam, and the first partial image beam and the second partial image beam are adapted to form the sub image beams.

4. The optical waveguide according to claim 1, wherein a size of each of the first light-guiding optical elements is smaller than 2 mm.

5. The optical waveguide according to claim 1, wherein a distance between the two adjacent second light-guiding optical elements is less than or equal to 4 mm.

6. The optical waveguide according to claim 1, wherein the plate body comprises:

a first structure layer, comprising a plurality of first inclined surfaces and a plurality of first connecting surfaces, wherein each of the first connecting surfaces is connected to different ends of the adjacent first inclined surfaces to form a first zigzag structure; and a second structure layer, comprising a plurality of second inclined surfaces and a plurality of second connecting surfaces, wherein each of the second connecting surfaces is connected to different ends of the adjacent second inclined surfaces to form a second zigzag structure, the second inclined surfaces correspond to the first inclined surfaces, the second connecting surfaces correspond to the first connecting surfaces, such that the first zigzag structure matches with the second zigzag structure to form the optical microstructures, and the second inclined surfaces are in contact with the first inclined surfaces to form the optical surfaces of the optical microstructures.

7. The optical waveguide according to claim 6, wherein the first structure layer further comprises a first plane, the second structure layer further comprises a second plane, and the second plane and the first plane are in contact with each other to form the light-guiding plane.

8. A manufacturing method of an optical waveguide adapted to transmit an image beam, the manufacturing method of the optical waveguide comprising:

providing a first structure layer, wherein the first structure layer comprises a first plane;

providing a second structure layer, wherein the second structure layer comprises a second plane;

forming a plurality of first light-guiding optical elements on the first plane or the second plane, wherein a spacing exists between the adjacent first light-guiding optical elements; and connecting the first structure layer with the second structure layer, such that the first plane and the second plane are in contact with each other to form a light-guiding plane, wherein the image beam transmitting to the light-guiding plane is separated into a plurality of sub image beams, transmission paths of the sub image beams are at least partially different, and the sub image beams are transmitted in a first optical region via total reflection, wherein the first structure layer comprises a plurality of first inclined surfaces and a plurality of first connecting surfaces, wherein each of the first connecting surfaces is connected to different ends of the adjacent first inclined surfaces to form a first zigzag structure, the second structure layer comprises a plurality of second inclined surfaces and a plurality of second connecting surfaces, wherein each of the second connecting surfaces is connected to different ends of the adjacent second inclined surfaces to form a second zigzag structure, and the manufacturing method of the optical waveguide further comprises:

forming a plurality of second light-guiding optical elements on the first inclined surfaces of the first structure layer or the second inclined surfaces of the second structure layer, wherein the second light-guiding optical elements are adapted to allow part of the image beam to pass therethrough and reflect another part of the image beam; and corresponding the second inclined surface to the first inclined surface, corresponding the second connecting surface to the first connecting surface, such that the first zigzag structure matches with the second zigzag structure to form a plurality of optical microstructures, and the second inclined surfaces are in contact with the first inclined surfaces to form a plurality of optical surfaces of the optical microstructures after connecting the first structure layer with the second structure layer.

9. The manufacturing method of the optical waveguide according to claim 8, wherein the optical waveguide comprises the first optical region and a second optical region, a plate body comprises a light-entering side, wherein the first optical region is located between the light-entering side and the second optical region, the first plane and the second plane are located in the first optical region, and the optical microstructures are located in the second optical region.

10. The manufacturing method of the optical waveguide according to claim 8, further comprising:
providing a bonding layer, adapted to connect the first structure layer with the second structure layer, wherein a difference between a refractive index of the bonding layer and a refractive index of the first structure layer is less than 0.01, and a difference between a refractive index of the bonding layer and a refractive index of the second structure layer is less than 0.01.

11. The manufacturing method of the optical waveguide according to claim 8, wherein a size of each of the first light-guiding optical elements is smaller than 2 mm.

12. A head-mounted display device, configured to be disposed in front of at least one eye of an user, comprising a display unit and an optical waveguide, wherein
the display unit is adapted to provide an image beam; and
the optical waveguide comprises a first optical region and a second optical region for transmitting the image beam, a plate body, a plurality of first light-guiding optical elements, and a plurality of optical coupling-out structures, wherein:
the plate body comprises a light-entering side, wherein the first optical region is located between the light-entering side and the second optical region;
the first light-guiding optical elements are disposed in parallel lines on a light-guiding plane in the optical waveguide, wherein the light-guiding plane is located in the first optical region, a spacing exists between the adjacent first light-guiding optical elements, the image beam transmitting to the light-guiding plane is separated into a plurality of sub image beams, transmission paths of the sub image beams are at least partially different, and the sub image beams in the first optical region are transmitted via total reflection to the second optical region; and
the optical coupling-out structures are disposed in the plate body and are located in the second optical region,
wherein the plate body comprises a first surface and a second surface opposite to each other, and the light-guiding plane is located between and parallel to the first surface and the second surface,
wherein the optical coupling-out structures are a plurality of optical microstructures, each of the optical microstructures respectively comprises an optical surface, the optical surfaces of the optical microstructures are respectively inclined with respect to the light-guiding plane, and the optical waveguide further comprises:
a plurality of second light-guiding optical elements, located on the optical surfaces of the optical microstructures, and adapted to reflect at least part of at least one of the sub image beams, wherein another part of the at least one of the sub image beams continues to be transmitted in the plate body, and the at least part of the at least one of the sub image beams leaves the plate body from the second surface after being reflected by the second light-guiding optical elements.

13. The head-mounted display device according to claim 12, wherein the first light-guiding optical elements are a partially reflective layer, when the image beam transmits to each of the first light-guiding optical elements, part of the image beam penetrates each of the first light-guiding optical elements to form a first sub image beam, and another part of the image beam is reflected by each of the first light-guiding optical elements to form a second sub image beam, and the first sub image beam and the second sub image beam are adapted to form the sub image beams.

14. The head-mounted display device according to claim 12, wherein the first light-guiding optical elements are a mirror reflection layer, when the image beam transmits to each of the first light-guiding optical elements, the image beam reflected by the first light-guiding optical elements forms a first partial image beam, the image beam passing through the spacing between the two adjacent first light-guiding optical elements forms a second partial image beam, and the first partial image beam and the second partial image beam are adapted to form the sub image beams.

15. The head-mounted display device according to claim 12, wherein a size of each of the first light-guiding optical elements is smaller than 2 mm.

16. The head-mounted display device according to claim 12, wherein a distance between the two adjacent second light-guiding optical elements is less than or equal to 4 mm.

17. The head-mounted display device according to claim 12, wherein the plate body comprises:
a first structure layer, comprising a plurality of first inclined surfaces and a plurality of first connecting surfaces, wherein each of the first connecting surfaces is connected to different ends of the adjacent first inclined surfaces to form a first zigzag structure; and
a second structure layer, comprising a plurality of second inclined surfaces and a plurality of second connecting surfaces, wherein each of the second connecting surfaces is connected to different ends of the adjacent second inclined surfaces to form a second zigzag structure, the second inclined surfaces correspond to the first inclined surfaces, the second connecting surfaces correspond to the first connecting surfaces, such that the first zigzag structures match with the second zigzag structures to form the optical microstructures, and the second inclined surfaces are in contact with the first inclined surfaces to form the optical surfaces of the optical microstructures.

18. The head-mounted display device according to claim 17, wherein the first structure layer further comprises a first plane, the second structure layer further comprises a second plane, and the second plane and the first plane are in contact with each other to form the light-guiding plane.

* * * * *